United States Patent [19]

Jackson

[11] Patent Number: 5,632,928
[45] Date of Patent: May 27, 1997

[54] AZEOTROPE (LIKE) COMPOSITIONS WITH OCTAFLUOROBUTANE, OPTIONALLY CHLORINATED, AND EITHER PERFLUORODIMETHYLCYCLOBUTANE OR PERFLUOROHEXANE

[75] Inventor: Scott C. Jackson, Kennett Square, Pa.

[73] Assignee: E. I. Du Pont de Nemours and Company, Wilmington, Del.

[21] Appl. No.: 454,767

[22] Filed: May 31, 1995

[51] Int. Cl.$^6$ .............. C09K 5/04; C23G 5/028; C11D 7/50; B01D 3/36
[52] U.S. Cl. .............. 252/67; 252/364; 510/408; 510/412; 510/415
[58] Field of Search .............. 252/67, 172, 305, 252/364; 203/67; 62/114, 324.1; 134/40; 510/408, 412, 415

[56] References Cited

U.S. PATENT DOCUMENTS

| | | | |
|---|---|---|---|
| 5,129,997 | 7/1992 | Schottle et al. | 203/99 |
| 5,194,170 | 3/1993 | Merchant et al. | 252/67 |
| 5,352,378 | 10/1994 | Mathisen et al. | 252/54 |
| 5,494,601 | 2/1996 | Flynn et al. | 252/171 |
| 5,531,916 | 7/1996 | Merchant | 510/412 |

FOREIGN PATENT DOCUMENTS

| | | |
|---|---|---|
| 439283 | 7/1991 | European Pat. Off. . |
| 3-000746 | 1/1991 | Japan . |
| 3-229732 | 10/1991 | Japan . |
| 96/10061 | 4/1996 | WIPO . |
| 96/10062 | 4/1996 | WIPO . |

*Primary Examiner*—Douglas J. McGinty

[57] ABSTRACT

Azeotrope and azeotropic-like compositions of the following are provided:

(a) Chlorotetrafluorethane with an effective amount of polybutene;

(b) Chlorohexafluoropane with an effective amount of perfluoro(alkane or alkene), wherein the alkane and alkene contains 5 carbon atoms; and (c) Octafluorobutane, optionally mono-chloro substituted, with an effective amount of perfluoro(alkane or alkene), wherein the alkane and alkene contains 5 carbon atoms, the effective amount in each case being sufficient to form said azeotropic or azeotrope-like composition.

2 Claims, No Drawings

5,632,928

AZEOTROPE (LIKE) COMPOSITIONS WITH OCTAFLUOROBUTANE, OPTIONALLY CHLORINATED, AND EITHER PERFLUORODIMETHYLCYCLOBUTANE OR PERFLUOROHEXANE

FIELD OF THE INVENTION

This invention relates to compositions, or mixtures, of fluorocarbons and more specifically to azeotropic or azeotrope-like compositions.

BACKGROUND OF THE INVENTION

Chemical processes for the production of fluorocarbons typically produce a number of impurities along with the desired product or products, which are then isolated by fractional distillation. The knowledge that any azeotropes exist, along with their composition and formation conditions, are vitally important for the efficient operation of these isolation processes. Such azeotropic compositions may also be valuable as products.

The fluorocarbon compositions described in this invention can occur as part of certain manufacturing processes and are believed to be useful as cleaning agents, expansion agents for polyolefins and polyurethanes, refrigerants, aerosol propellants, heat transfer media, gaseous dielectrics, fire extinguishing agents, powercycle working fluids, polymerization media, particulate working fluids, carrier fluids, buffing abrasive agents and displacement drying fluids.

One of the important uses of fluorocarbons is as a cleaning agent or solvent to clean, for example, electronic circuit boards. Electronic components are soldered to circuit boards by coating the entire circuit side of the of the board with flux and thereafter passing the flux-coated board over preheaters and through molten solder. The flux cleans the conductive metal parts and promotes solder fusion, but leaves residues on the circuit boards that must be removed with a cleaning agent. Preferably, cleaning agents should have a low boiling point, non-flammability, low toxicity, and high solvency power so that flux and flux-residues can be removed without damaging the substrate being cleaned. Further, it is desirable that cleaning agents that include a fluorocarbon be azeotropic or azeotrope-like so that they do not tend to fractionate upon boiling or evaporation. If the cleaning agent were not azeotropic or azeotrope-like, the more volatile components of the cleaning agent would preferentially evaporate, and the cleaning agent could become flammable or have less desirable solvency properties, such as lower flux solvency and lower inertness toward the electrical components being cleaned. The azeotropic property is also desirable in vapor degreasing operations because the cleaning agent is generally redistilled and reused for final rinse cleaning.

Fluorocarbons may also be used as refrigerants. In refrigeration applications, a refrigerant is often lost during operation through leaks in shaft seals, hose connections, solder joints and broken lines. In addition, the refrigerant may be released to the atmosphere during maintenance operations on refrigeration equipment. Accordingly it is desirable to use a single fluorocarbon or an azeotrope or azeotrope-like composition that includes one or more fluorocarbons as a refrigerant. Nonazeotropic compositions have the disadvantage of changing composition, or fractionating, when a portion of the refrigerant charge is leaked or discharged to the atmosphere. Refrigeration equipment operation could be adversely affected due to the change in composition and vapor pressure that results from fractionation.

Azeotropic or azeotrope-like compositions of fluorocarbons are also useful as blowing agents in the manufacture of close-cell polyurethane, phenolic and thermoplastic foams. Insulating foams require blowing agents not only to foam the polymer, but more importantly to utilize the low vapor thermal conductivity of the blowing agents, which is an important characteristic for insulation value.

Aerosol products employ both single component fluorocarbons and azeotropic or azeotrope-like compositions of fluorocarbons as propellant vapor pressure attenuators in aerosol systems. Azeotropic or azeotrope-like compositions, with their substantially constant compositions and vapor pressures, are useful as solvents and propellants in aerosols.

Azeotropic or azeotrope-like compositions that include fluorocarbons are also useful as heat transfer media, gaseous dielectrics, fire extinguishing agents, power cycle working fluids such as for heat pumps, inert media for polymerization reactions, fluids for removing particulates from metal surfaces, and as carrier fluids that may be used, for example, to place a fine film of lubricants on metal parts.

Azeotropic or azeotrope-like compositions that include fluorocarbons are further useful as buffing abrasive detergents to remove buffing abrasive compounds from polished surfaces such as metal, as displacement drying agents for removing water such as from jewelry or metal parts, as resist-developers in conventional circuit manufacturing techniques employing chlorine-type developing agents, and as strippers for photoresists when used with, for example, a chlorohydrocarbon such as 1,1,1-trichloroethane or trichloroethylene.

Some of the fluorocarbons that are currently used in these applications have been linked to depletion of the earth's ozone layer and to global warming. What is needed, therefore, are azeotropic or azeotrope-like substitutes for such fluorocarbons that have low ozone depletion potentials and low global warming potentials.

Production of certain fluorocarbons can result in the inadvertant production of azeotropes, as for example when hydrogenating an unsaturated perfluorinated compound, or partially fluorinating a chlorofluorocarbon species. The recovery of azeotropes or azeotrope-like mixtures from the waste streams of existing chemical manufacturing processes makes it feasible to turn a waste product into a useful one, benefitting the environment.

U.S. Pat. No. 3,173,872 discloses that mixtures of difluoromethane (HFC-32) and perfluoropropane (PFC-218) have a nearly constant boiling point through the range of perfluoropropane content ranging from about 10 to 62 mol %.

From the open chemical literature (Horseley, L. H., "Azeotropic Data-III", Advances in Chemistry Series #116, American Chemical Society, Washington DC, (1973)), it is known that minimum boiling azeotropes are formed by binary mixtures of: 1-chloro-1,1,2,2-tetrafluoroethane (HCFC-124a) and perfluorocyclobutane (PFC-C318), chlorodifluoromethane (HCFC-22) and perfluoropropane (PFC-218), and chlorodifluoromethane and hexafluoropropylene (PFC-1216).

SUMMARY OF THE INVENTION

The present invention relates to the discovery of azeotropic or azeotrope-like compositions comprising admixtures of effective amounts consisting essentially of certain hydrochlorofluorocarbons (HCFC's) or hydrofluorocarbons (HFC's) with certain perfluorocarbons (PFC's). These azeotropic or azeotrope-like compositions are as follows:

(a) Chlorotetrafluorethane with an effective amount of perfluorobutene;

(b) Chlorohexafluoropane with an effective amount of perfluoro(alkane or alkene), wherein the alkane and alkene contains 5 carbon atoms; or (c) Octafluorobutane, optionally mono-chloro substituted, with an effective amount of perfluoro(alkane or alkene), wherein the alkane and alkene contains 6 carbon atoms, the effective amount in each case being sufficient to form said azeotropic or azeotrope-like composition.

DETAILED DESCRIPTION OF THE INVENTION

Examples of constant-boiling, azeotropic or azeotrope-like compositions of the present invention are as follows:

For 1-chloro-1,1,2,2-tetrafluoroethane (HCFC-124a) or 1-chloro-1,2,2,2-tetrafluoroethane (HFC-124), the perfluorinated component can include, among others; cis or trans perfluorobutene (PFC-1318).

For 1-chloro-1,1,2,2,3,3-hexafluoropropane (HCFC-226cb), the perfluorinated component can include, among others: perfluoropentane (PFC-41-12), perfluoromethylcyclobutane (PFC-C41-10), perfluoropentene (PFC-141-10), or perfluorocyclopentene (PFC-C141-8y).

For 1-chloro-1,1,2,2,3,3,4,4-octofluorobutane (HCFC-328 lcc), the perfluorinated component can include, among others: perfluorodimethylcyclobutane (PFC-C51-12), perfluorohexane (PFC-51-14), perfluoromethylpentane, or perfluoromethylpentene.

For 1,1,2,2,3,3,4,4-octafluorobutane (HFC-338 pcc), the perfluorinated component can include, among others: perfluorodimethylcyclobutane (PFC-C51-12) perfluorohexane (PFC-51-14), perfluoromethylpentane or perfluoromethylpentene.

By "azeotrope" or "azeotropic" composition is meant a constant boiling liquid admixture of two or more substances that behaves as a single substance. One way to characterize an azeotropic composition or mixture is that the vapor produced by partial evaporation or distillation of the liquid has the same composition as the liquid from which it was evaporated or distilled, e.g., the admixture distills/refluxes without compositional change. Constant boiling compositions are characterized as azeotropic because they exhibit either a maximum or minimum boiling point, as compared with that of the non-azeotropic mixtures of the same components. An azeotropic composition can also be characterized as the maximum or minimum vapor pressure for a mixture at a given temperature when plotted as a function of mole fraction.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, e.g., the admixture distills/refluxes without substantial compositional change. An azeotrope-like composition can also be characterized by the compositions adjacent to the composition showing a maximum or minimum vapor pressure for a mixture at a given temperature. This is shown in Table 1 as the mole fraction range for the azeotrope components, determined from gas chromatography (GC) analysis of the distillate in Example 1, indicating a constant temperature condition over the mole fraction ranges indicated. This is also shown in Table 2 wherein the mole fraction ranges were determined from the close proximity of the vapor and liquid composition curves surrounding the azeotropic composition. Experience has shown that compositions exhibiting this proximity are difficult to separate by distillation, thereby indicating azeotrope-like behavior. Experience also indicates that when these compositions are subjected to evaporation, e.g., by boiling, to remove 50 wt % of the composition, the difference in vapor pressure between that of the original composition and the composition when up to 50 wt % has vaporized is less than 10% when measured in absolute pressure units, thus exhibiting azeotrope-like behavior.

By "effective amount" is intended to refer to the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points. Effective amount also includes the amounts of each component of the compositions of the instant invention which form azeotropic or azeotrope-like compositions at temperatures or pressures other than as described herein.

It is possible to characterize, in effect, a constant boiling admixture which may appear under many guises, depending upon the conditions chosen, by any of several criteria:

1. The composition can be defined as an azeotrope of the HCFC/HFC component and the PFC component, because the term "azeotrope" is at once both definitive and limitative, and requires effective amounts of the HCFC/HFC component and the PFC component for this unique composition of matter which can be a constant boiling composition.

2. It is well known by those skilled in the art, that, at different pressures, the composition of a given azeotrope will vary at least to some degree, and changes in pressure will also change, at least to some degree, the boiling point temperature. Thus, an azeotrope of the HCFC/HFC component and the PFC component represents a unique type of relationship but with a variable composition which depends on temperature and/or pressure. Therefore, compositional ranges, rather than fixed compositions, are often used to define azeotropes.

3. The composition can be defined as a particular weight percent relationship or mole percent relationship of the HCFC/HFC component and the PFC component, while recognizing that such specific values point out only one particular relationship and that in actuality, a series of such relationships, represented by the HCFC/HFC component and the PFC component actually exist for a given azeotrope, varied by the influence of pressure.

4. An azeotrope of the HCFC/HFC component and the PFC component can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention may be formed by operating a conventional distillation apparatus on the byproduct stream from pyrolyzing $CHClF_2$ to obtain tetrafluoroethylene and hexafluoropropylene, or by combining effective amounts of the components by any convenient method including mixing, combining, among others. Vapor pressure measurements can be converted to equilibrium vapor and liquid compositions by use of an activity coefficient equation model, such as the Non-Random, Two-Liquid (NRTL) equation, to represent liquid phase non-idealities. Use of an activity coefficient equation, such as the NRTL equation, is described in greater detail in "The Properties of Gases and Liquids, 4th edition, publisher McGraw Hill, written by Reid, Prausnitz and Poling, on pages 241 to 387; and "Phase Equilibria in Chemical Engineering, published by Butterworth Publishers, 1985, written by Stanley M. Walas, pages 165 to 244. The entire disclosures of each of the previously identified references are hereby incorporated by reference.

The compositions of the present invention are especially useful either as feedstocks for pyrolysis to tetrafluoroethylene by known methods or solvents and cleaning agents.

EXAMPLES

Example 1

Batch Distillation of Mixture

The azeotropes listed in Table 1 below were obtained by batch distilling industrial mixtures of HCFC-124a, HCFC-124, HCFC-226cb, HCFC-328 lcc, HCFC-338 pcc, PFC-1318, PFC-41-12, PFC-C41-10, PFC-141-10, PFC-C 141-8y, PFC-C 51-12, PFC-51-14, perfluoromethylpentane and perfluoromethylpentene, among other components. The distillation column used was 40 feet (12.2 m) tall and made from 8 inch (20.3 cm) Schedule 40 steel pipe. The packing extended for a total of 36 feet (11 m) in two packed sections within the column. The packing used was Norton® 15. There were liquid redistributers at the top of each packed section. Approximately 500 pounds (227 kg) of a mixture containing the components listed in Table 1 was charged to the reboiler at the base of the column. The reboiler or pot was heated up while the condenser was cooled. Steam was fed to the reboiler at a rate of 102 pounds (46.3 kg) per hour (pph) and a pressure of 150 psig (1.04 MPa) pressure to vaporize the material. This resulted in a boilup rate in the column of about 1470 pph (667 kg/hr). Initially, all the material was refluxed from the condenser back down the column. Brine, initially chilled to −10° C, was used to condense the overhead vapors. After the column operation was stabilized, i.e., the temperature profile, boil up rate and condensing rate remained constant, material was taken off the top of the column. The take-off rate was about 30 pph (13.6 kg/hr) while the boilup rate and reflux rate remained the same as stated above. This gave a very high reflux ratio of 50. The column pressure was controlled at 75 psia (0.52 MPa) throughout the distillation. The condenser or overhead temperature was the boiling point (at the column pressure) of the material taken off the column at that time. As the distillation progressed, all the temperatures in the column slowly rose as higher boiling material was taken off the top of the column. If a pure material or an azeotrope or azeotrope-like composition was at a sufficiently high concentration in the pot charge, then the temperature profile appeared flat through the column as this material traveled up the column. The purity of the overhead product was monitored by gas chromatograph (GC) and by gas chromatographic/mass spectrometer (GC/MS) analyses. Because of the separation capability of the distillation column, it was a surprise to find components which were expected to separate, did not. The composition of these overhead mixtures appeared to stay constant for a significant period of time while the mixture was continuously removed from the column. The overhead temperature was several degrees below the boiling points of either pure component. This indicated the presence of a minimum boiling azeotrope or azeotrope-like composition. The overhead composition, column pressure, and overhead analysis (by gas chromatography) were noted and are listed in Table 1 as the azeotrope and azeotrope-like composition. Many of these azeotropes were also confirmed by measuring the vapor-liquid equilibrium of the mixture using a PTX (pressure, temperature, composition) technique (Examples 2 through 6 below). Many batch distillations were also performed on various mixtures of fluorocarbons in the compositions.

In Tables 1 and 2 below, the first number in the column headed "HCFC/HFC Mole Fraction" is the estimate of the azeotropic composition as the mole fraction of the HCFC/HFC component. The range given in parentheses is the estimate of the range of compositions which are azeotrope-like at 75 psia (0.52 MPa) and the temperature indicated. The estimates are obtained from GC and GC/mass spec. analysis and from vapor/liquid composition curves as described hereinbefore.

TABLE 1

| Azeotropic Compositions by Distillation | | | |
|---|---|---|---|
| HCFC/HFC Component | PFC Component | Azeotrope Temperature °C. | HCFC/HFC Mole Fraction |
| HCFC-124 a | PFC-1318 | 35 | 0.9 (0.7–0.98) |
| HCFC-124 | PFC-1318 | 35 | 0.9 (0.7–0.98) |
| HCFC-226 cb | PFC-41-12 | 68 | 0.9 |
| HCFC-226 cb | PFC-C41-10 | 68 | 0.8 (0.6–0.95) |
| HCFC-226 cb | PFC-141-10 | 68 | 0.8 (0.6–0.95) |
| HCFC-226 cb | PFC-C-141-8y | 68 | 0.8 (0.6–0.95) |
| HCFC-328 lcc | PFC-C51-12 | 98 | 0.4 |
| HCFC-328 lcc | PFC-51-14 | 98 | 0.8 |
| HCFC-328 lcc | perfluoromethyl-pentane | 98 | 0.85 (0.7–0.98) |

TABLE 1-continued

Azeotropic Compositions by Distillation

| HCFC/HFC Component | PFC Component | Azeotrope Temperature °C. | HCFC/HFC Mole Fraction |
|---|---|---|---|
| HCFC-328 lcc | perfluoromethyl-pentene | 102 | 0.85 (0.7–0.98) |
| HFC-338 pcc | PFC-C51-12 | 92 | 0.8 |
| HFC-338 pcc | PFC-51-14 | 92 | 0.8 |

Note 1: All the above azeotropes are minimum boiling (maximum pressure) azeotropes and are determined at constant pressure in the distillation column. Note 2: The azeotrope temperature of HCFC-124a/PFC-1318 and HCFC-124/PFC-1318 was in the range 34°–35° C.

Examples 2 through 6

PTX Measurements of Azeotropes

To obtain additional information on the azeotropic compositions, PTX measurements were made on specific pairs of compounds, as detailed in Examples 2 through 6 below. Overall results are summarized in Table 2.

TABLE 2

Azeotropic Compositions by PTX Measurements

| HCFC/HFC Component | PFC Component | Azeotrope Temp. °C. | Azeotrope Press. psia (MPa) | HCFC/HFC Mole Fraction |
|---|---|---|---|---|
| HCFC-226 cb | PFC-41-12 | 14.5 | 11.8 (0.08) | 0.77 (0.6–0.95) |
| HCFC-328 lcc | PFC-C51-12 | 49.4 | 17.7 (0.12) | 0.28 (0.1–0.4) |
| HCFC-328 lcc | PFC-51-14 | 49.4 | 14.9 (0.10) | 0.78 (0.6–0.95) |
| HFC-338 pcc | PFC-C51-12 | 49.4 | 21.5 (0.15) | 0.49 (0.4–0.6) |
| HFC-338 pcc | PFC-51-14 | 49.4 | 19.1 (0.13) | 0.76 (0.65–0.85) |

Note 1: All the above azeotropes are minimum boiling (maximum pressure) azeotropes. Note 2: This information on azeotropes is determined at constant temperature, but pressure varies with azeotrope composition, whereby the azeotropic and azeotrope-like compositions determined by PTX measurement is characterized by the temperature and mole fraction of the composition, pressure being variable and established by the mole fraction.

Example 2

PTX Measurements for HCFC-226cb and PFC-41-12

Three air tight 75 cc stainless steel cylinders were cleaned and evacuated. One cylinder was loaded with about 50 grams of PFC-41-12. About 25 grams of HCFC-226cb was loaded into each of the other two cylinders. The material in each of the cylinders were chilled in liquid nitrogen and degassed by pulling vacuum on any inerts that remained in the vapor in each sample. A constant temperature bath was prepared and its temperature was regulated precisely to 14.5° C. The vapor pressures of the material in each cylinder was measured using a precision pressure transducer, e.g., Barocel® by MKS, Inc. A slight amount of PFC-41-12 was transferred to one of the HCFC-226cb cylinders. The vapor pressure of this mixture in the constant temperature bath and the weight of material was accurately measured and recorded. More PFC-41-12 was added to the HCFC-226cb. The pressure and weight were measured and recorded. This was repeated several times until about 25 grams of PFC-41-12 had been added to the HCFC-226cb. Next, pure HCFC-226cb from the second cylinder was added to the pure PFC-41-12 left in its cylinder. The pressure in the PFC-41-12 cylinder and the weight of HCFC-226cb were measured and recorded. More HCFC-226cb was added stepwise as before and the pressure and weights measured and recorded. A suitable thermodynamic model was used to refine the data. This included correcting the liquid composition for material that was inventoried in the vapor space of the measurement cell. A minimum boiling azeotrope occurred when the measured pressure of the binary mixture went through a maximum. The composition, pressure and temperature at this maximum pressure is the azeotropic composition listed in Table 2.

TABLE 3

Measured Liquid Mole Compositions and Pressures of Binary HCFC-226 cb/PFC-41-12 Mixtures at 14.5° C.

| Measured HCFC-226 cb Mole fraction in liquid | Measured Pressure in psia (MPa) | |
|---|---|---|
| 0.0000 | 8.159 (calc) | (0.00563) |
| 0.1355 | 9.690 | (0.0669) |
| 0.2326 | 10.400 | (0.0718) |
| 0.3896 | 11.198 | (0.0773) |
| 0.4862 | 11.520 | (0.0795) |
| 0.6000 | 11.792 | (0.0814) |
| 0.6666 | 11.700 | (0.807) |
| 0.8126 | 11.760 | (0.0811) |
| 0.9508 | 11.467 | (0.0791) |
| 1.0000 | 11.487 (calc) | (0.0793) |

A maximum pressure azeotrope was found to exist at 0.7667 mole fraction HCFC-226cb and at 11.824 psia (0.0816 MPa), determined from the above data by use of the NRTL equation. Azeotrope-like behavior was shown over the range of 0.6 to 0.95 mole fraction of HCFC-226cb.

Example 3

PTX Measurements for HCFC-328 lcc and PFC-51-12

The procedure of Example 2 was followed except that HCFC-328 lcc was substituted for HCFC-226cb, PFC-C51-12 was substituted for PFC-41-12, and the temperature was held at 49.4° C.

TABLE 4

Measured Liquid Mole Compositions and Pressures of Binary HCFC-328 lcc/PFC-C51-12 Mixtures at 49.4° C.

| Measured HCFC-328 lcc Mole fraction in liquid | Measured Pressure in psia (MPa) | |
|---|---|---|
| 0.0000 | 17.116 | (0.1181) |
| 0.0340 | 17.349 | (0.1197) |

TABLE 4-continued

Measured Liquid Mole Compositions and Pressures of Binary HCFC-328 lcc/PFC-C51-12 Mixtures at 49.4° C.

| Measured HCFC-328 lcc Mole fraction in liquid | Measured Pressure in psia (MPa) | |
| --- | --- | --- |
| 0.1132 | 17.618 | (0.1215) |
| 0.2192 | 17.651 | (0.1218) |
| 0.2780 | 17.706 | (0.1222) |
| 0.3455 | 17.638 | (0.1217) |
| 0.6842 | 16.736 | (0.1155) |
| 0.7605 | 16.331 | (0.1127) |
| 0.8396 | 16.854 | (0.1094) |
| 0.9324 | 15.100 | (0.1042) |
| 1.0000 | 14.452 | (0.0997) |

A maximum pressure azeotrope was found to exist at 0.2806 mole fraction HCFC-328 Icc at 49.4° C. and 17.714 psia (0.1222 MPa), determined from the above data by use of the NRTL equation. Azeotrope-like behavior was shown over the range of 0.1 to 0.4 mole fraction HCFC-328 lcc.

EXAMPLE 4

PTX Measurements for HCFC-328 lcc and PFC-51-14

The procedure of Example 2 was followed except that HCFC-328 lcc was substituted for HCFC-226cb, PFC-51-14 was substituted for PFC-41-12, and the temperature was held at 49.4° C.

TABLE 5

Measured Liquid Mole Compositions and Pressures of Binary HCFC-328 lcc/PFC-51-14 Mixtures at 49.4° C.

| Measured HCFC-328 lcc Mole fraction in liquid | Measured Pressure in psia (MPa) | |
| --- | --- | --- |
| 0.0000 | 11.184 | (0.0772) |
| 0.1863 | 12.788 | (0.0882) |
| 0.2866 | 13.484 | (0.0930) |
| 0.4158 | 14.043 | (0.0969) |
| 0.4771 | 14.282 | (0.0985) |
| 0.6182 | 14.812 | (0.1022) |
| 0.7102 | 14.937 | (0.1031) |
| 0.7997 | 14.950 | (0.1031) |
| 0.8756 | 14.880 | (0.1027) |
| 0.9338 | 14.746 | (0.1017) |
| 1.0000 | 14.438 | (0.0996) |

A maximum pressure azeotrope was found to exist at 0.7816 mole fraction of HCFC-328 lcc at 49.4° C. and 14.94 psia (0.103MPa), determined from the above data by use of the NRTL equation. Azeotrope-like behavior was shown over the range of 0.6 to 0.95 mole fraction of HCFC-328 lcc.

EXAMPLE 5

PTX Measurements for HCFC-338 pcc and PFC-51-12

The procedure of Example 2 was followed except that HCFC-338 pcc was substituted for HCFC-226cb, PFC-C51-12 was substituted for PFC-41-12, and the temperature was held at 49.4° C.

TABLE 6

Measured Liquid Mole Compositions and Pressures of Binary HCFC-338 pcc/PFC-C51-12 Mixtures at 49.4° C.

| Measured HCFC-338 pcc Mole fraction in liquid | Measured Pressure in psia (MPa) | |
| --- | --- | --- |
| 0.0000 | 17.198 | (0.1187) |
| 0.760 | 18.839 | (0.1300) |
| 0.2226 | 20.639 | (0.1424) |
| 0.3650 | 21.349 | (0.1473) |
| 0.4936 | 21.369 | (0.1474) |
| 0.5843 | 21.265 | (0.1467) |
| 0.6348 | 21.143 | (0.1459) |
| 0.7121 | 20.872 | (0.1440) |
| 0.8120 | 20.236 | (0.1396) |
| 0.9275 | 18.802 | (0.1297) |
| 1.0000 | 17.544 | (0.1211) |

A maximum pressure azeotrope was found to exist at 0.4895 mole fraction HCFC-338 pcc, at 49.4° C. and 21.475 psia (determined from the above data by use of the NRTL equation). Azeotrope-like behavior was shown over the range of 0.4 to 0.6 mole fraction HCFC-338 pcc.

EXAMPLE 6

PTX Measurements for HCFC-338 pcc and PFC-51-14

The procedure of Example 2 was followed except that HCFC-338 pcc was substituted for HCFC-226cb, PFC-51-14 was substituted for PFC-41-12, and the temperature was held at 49.4° C.

TABLE 7

Measured Liquid Mole Compositions and Pressures of Binary HCFC-338 pcc/PFC-51-14 Mixtures at 49.4° C.

| Measured HCFC-338 pcc Mole fraction in liquid | Measured Pressure in psia (MPa) | |
| --- | --- | --- |
| 0.0000 | 11.184 | (0.0772) |
| 0.1821 | 15.091 | (0.1041) |
| 0.2485 | 16.094 | (0.1110) |
| 0.3585 | 17.281 | (0.1192) |
| 0.5688 | 18.537 | (0.1279) |
| 0.6077 | 18.887 | (0.1303) |
| 0.7071 | 19.092 | (0.1317) |
| 0.8166 | 19.033 | (0.1313) |
| 0.9227 | 18.566 | (0.1281) |
| 1.0000 | 17.632 | (0.1217) |

A maximum pressure azeotrope was found to exist at 0.7573 mole fraction HCFC-338 pcc at 49.4° C. and at a pressure of 19.077 psia (0.13 16MPa), determined from the above data by use of the NRTL equation. Azeotrope-like behavior was shown over the range of 0.65 to 0.85 mole fraction HCFC-338 pcc.

What is claimed is:

1. Azeotrope or azeotrope-like compsitions consisting essentially of 1-chloro-1,1,2,2,3,3,4,4-octafluorobutane with perfluorodimethylcyclobutane or perfluorohexane in a mole fraction of 0.1 to 0.4 and 0.6–0.95, respectively, at 49.4° C. and 17.7 psia and 14.9 psis, respectively.

2. Azeotrope or azeotrope-like compositions consisting essentially of 1,1,2,2,3,3,4,4- octafluorobutane with perfluorodimethylcyclobutane or perfluorohexane in a mole fraction at 49.4° C. of 0.4 to 0.6 and 0.65–0.85 and pressure of 21.5 psia and 19.1 psis, respectively.

* * * * *